US010400102B2

(12) United States Patent
Zheng et al.

(10) Patent No.: US 10,400,102 B2
(45) Date of Patent: Sep. 3, 2019

(54) THERMAL CONDUCTIVE COMPOSITIONS HAVING GOOD IMPACT PERFORMANCE

(71) Applicant: SABIC Global Technologies B.V., Bergen op Zoom (NL)

(72) Inventors: Yun Zheng, Shanghai (CN); Huanbing Wang, Shanghai (CN); Yaqin Zhang, Shanghai (CN); Xiaodong He, Shanghai (CN)

(73) Assignee: SABIC GLOBAL TECHNOLOGIES B.V, Bergen op Zoom (NL)

( * ) Notice: Subject to any disclaimer, the term of this patent is extended or adjusted under 35 U.S.C. 154(b) by 129 days.

(21) Appl. No.: 15/316,939

(22) PCT Filed: Jun. 8, 2015

(86) PCT No.: PCT/IB2015/054331
§ 371 (c)(1),
(2) Date: Dec. 7, 2016

(87) PCT Pub. No.: WO2015/189761
PCT Pub. Date: Dec. 17, 2015

(65) Prior Publication Data
US 2017/0101530 A1    Apr. 13, 2017

Related U.S. Application Data

(60) Provisional application No. 62/009,734, filed on Jun. 9, 2014.

(51) Int. Cl.
| C08L 69/00 | (2006.01) |
| C08K 3/013 | (2018.01) |
| C08L 101/12 | (2006.01) |
| C08L 67/02 | (2006.01) |
| C09K 5/14 | (2006.01) |
| C08L 51/06 | (2006.01) |
| C08L 83/10 | (2006.01) |

(52) U.S. Cl.
CPC ............ *C08L 69/005* (2013.01); *C08K 3/013* (2018.01); *C08L 51/06* (2013.01); *C08L 67/02* (2013.01); *C08L 69/00* (2013.01); *C08L 83/10* (2013.01); *C08L 101/12* (2013.01); *C09K 5/14* (2013.01); *C08K 2201/001* (2013.01); *C08L 2205/03* (2013.01); *C08L 2205/035* (2013.01)

(58) Field of Classification Search
CPC .......... C08L 51/00; C08L 51/06; C08L 69/00; C08L 69/005
See application file for complete search history.

(56) References Cited

U.S. PATENT DOCUMENTS

| 2004/0011999 | A1 | 1/2004 | Murray | |
| 2006/0202117 | A1* | 9/2006 | Maeda | H01L 27/14618 250/239 |
| 2009/0111943 | A1 | 4/2009 | Bhat et al. | |
| 2009/0152491 | A1 | 6/2009 | Saga | |
| 2009/0321687 | A1 | 12/2009 | Kim | |
| 2013/0079443 | A1 | 3/2013 | Taschner et al. | |
| 2013/0261235 | A1* | 10/2013 | Minemura | C08G 77/42 524/165 |
| 2013/0317173 | A1 | 11/2013 | Li | |
| 2014/0171575 | A1* | 6/2014 | Mercx | C08K 5/5419 524/433 |
| 2014/0231701 | A1* | 8/2014 | Shin | C08L 69/00 252/76 |
| 2015/0060872 | A1* | 3/2015 | Hosseini | H01L 23/3135 257/76 |
| 2016/0215124 | A1* | 7/2016 | Takano | C08K 7/14 |

FOREIGN PATENT DOCUMENTS

| CN | 1681885 A | 10/2005 |
| CN | 101173089 A | 5/2008 |
| CN | 101555347 A | 10/2009 |
| CN | 101861353 A | 10/2010 |
| CN | 102746623 A | 10/2012 |
| CN | 103509316 A | 1/2014 |
| JP | 2011-500957 A | 1/2011 |
| KR | 10-0706651 B | 4/2007 |
| WO | WO 2008/078849 A1 | 7/2008 |

OTHER PUBLICATIONS

Hao et al.; Supplementary Description of the Pharmacopoeia of the People's Republic of China—Part one (medicine and decoction); Traditional Chinese Traditional Medicine Press; 2010; p. 560 (*contains English Translation*).

* cited by examiner

*Primary Examiner* — Jeffrey C Mullis
(74) *Attorney, Agent, or Firm* — BakerHostetler

(57) ABSTRACT

In various aspects, the disclosure relates to thermally conductive thermoplastic compositions comprising a polymer matrix, an impact modifier composition having a chemically reactive impact modifier, and, optionally, a chemically non-reactive impact modifier, and a thermally conductive filler. The disclosed thermally conductive thermoplastic compositions exhibit good thermal conductivity and improved impact and ductile properties.

13 Claims, No Drawings

THERMAL CONDUCTIVE COMPOSITIONS HAVING GOOD IMPACT PERFORMANCE

CROSS-REFERENCE TO RELATED APPLICATIONS

This application is the National Stage of International Application No. PCT/IB2015/054331, filed Jun. 8, 2015, which claims the benefit of U.S. Provisional Application No. 62/009,734, filed Jun. 9, 2014.

BACKGROUND

There is a continuously growing demand from the consumer electronic industry to provide mobile devices, such as tablets and smart phones, having stronger electronic capabilities and larger screens having higher resolutions, which requires increased horsepower and leads to increased heat generation. At the same time, the devices are becoming thinner and thinner, meaning all the functional components of the device are imbedded into a limited space which is not good for heat dissipation. Thus, thermal management to control heat dissipation is becoming more critical for these applications. For example, consumers do not want to handle devices that are heating up, and because the device may be working at elevated temperatures for extended periods of time, the lifetime of the device may be shortened.

As a result, structural materials with good thermal conductivity are getting more industry interest. Polycarbonate, polycarbonate blends or reinforced polycarbonates are widely used in those applications due to good dimension stability and mechanical properties. However, today's common practice of increasing thermal conductivity of polycarbonate materials is to introduce a large amount of inorganic fillers having higher thermal conductivity into the formulation, which, unfortunately, will adversely drop the ductility and impact strength of the blend. It is very challenging to get polycarbonate material with balanced thermal conductivity and impact performance.

Accordingly, it would be beneficial to provide thermoplastic polymer blends compositions, which include polycarbonates or polycarbonate derivatives having an improved thermal conductivity and well balanced impact strength.

SUMMARY

The present disclosure satisfies these and other needs by providing thermally conductive thermoplastic compositions which include polymer matrix and further comprise a chemically reactive impact modifier.

In one aspect, disclosed herein a thermally conductive thermoplastic composition, comprising: a) a polymer matrix; b) an impact modifier composition having a chemically reactive impact modifier, and, optionally, a chemically non-reactive impact modifier and c) a thermally conductive inorganic filler; wherein the thermoplastic polymer blend composition exhibits a through-plane thermal conductivity equal or greater than 0.4 watt per meter per kelvin (W/mK), an in-plane thermal conductivity equal or greater than 1.0 W/mK, and wherein the thermoplastic polymer blend composition exhibits a notched IZOD impact strength measured accordingly to ASTM D256 higher than that of an identical reference polymer blend composition in the absence of the chemically reactive impact modifier.

In another aspect, disclosed herein a thermally conductive thermoplastic composition, comprising: a) from about 30 weight percent (wt %) to about 80 wt % of a polymer matrix; b) an impact modifier composition having from about 0.5 wt % to about 10 wt % of a chemically reactive impact modifier, and, optionally, from about 0 wt % to about 20 wt % of a chemically non-reactive impact modifier and c) from about 10 wt % to about 50 wt % of a thermally conductive inorganic filler; wherein the thermally conductive thermoplastic composition exhibits a through-plane thermal conductivity equal or greater than 0.3 W/mK, an in-plane thermal conductivity equal or greater than 0.8 W/mK, and wherein the thermally conductive thermoplastic composition exhibits a notched IZOD impact strength measured accordingly to ASTM D256 higher than that of an identical reference polymer blend composition in the absence of the chemically reactive impact modifier.

In still another aspect, a method of forming a thermally conductive thermoplastic composition is provided. The method of making a thermally conductive thermoplastic composition, comprises: a) mixing: i) a polymer matrix; ii) an impact modifier composition having a chemically reactive impact modifier, and, optionally, a chemically non-reactive impact modifier and iii) a thermally conductive inorganic filler; b) to create a mixture that does not exceed 100 wt %, wherein the thermoplastic polymer blend composition exhibits a through-plane thermal conductivity equal or greater than 0.4 W/mK, an in-plane thermal conductivity equal or greater than 1.0 W/mK, and wherein all weight percent value are based on the total weight of the composition; and wherein the formed thermoplastic composition exhibits a notched IZOD impact strength measured accordingly to ASTM D256 higher than that of an identical reference polymer blend composition in the absence of the chemically reactive impact modifier.

In yet another aspect, disclosed herein a method of forming a thermally conductive thermoplastic composition is provided comprising: a) mixing i) from about 30 wt % to about 80 wt % of a polymer matrix; ii) from about 0.5 wt % to about 10 wt % of a chemically reactive impact modifier, and, optionally, from about 0 wt % to about 20 wt % of a chemically non-reactive impact modifier and iii) from about 10 wt % to about 50 wt % of a thermally conductive inorganic filler; b) to create a mixture that does not exceed 100 wt %, and wherein all weight percent value are based on the total weight of the composition; wherein the thermoplastic polymer blend composition exhibits a through-plane thermal conductivity equal or greater than 0.4 W/mK, an in-plane thermal conductivity equal or greater than 1.0 W/mK, and wherein the formed thermoplastic polymer blend composition exhibits a notched IZOD impact strength measured accordingly to ASTM D256 higher than that of an identical reference polymer blend composition in the absence of the chemically reactive impact modifier.

Additional aspects of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

DETAILED DESCRIPTION

As briefly described above, the present disclosure generally relates to a thermally conductive thermoplastic composition comprising a polymer matrix, a chemically reactive impact modifier, and a thermally conductive inorganic filler.

As described more fully below, the incorporation of a chemically reactive impact modifier in a polycarbonate blend has been found to improve impact strength and ductility of the composition without adversely affecting thermal conductivity of the composition. Accordingly, aspects of the present disclosure generally provides a thermally conductive thermoplastic composition comprising: a) a polymer matrix; b) an impact modifier composition having a chemically reactive impact modifier, and, optionally, a chemically non-reactive impact modifier and c) a thermally conductive inorganic filler; wherein the thermally conductive thermoplastic composition exhibits a through-plane thermal conductivity equal or greater than 0.4 W/mK, an in-plane thermal conductivity equal or greater than 1.0 W/mK, and wherein the thermally conductive thermoplastic composition exhibits a notched IZOD impact strength measured accordingly to ASTM D256 higher than that of an identical reference polymer blend composition in the absence of the chemically reactive impact modifier.

In one aspect, the disclosed thermally conductive thermoplastic composition exhibits a notched IZOD impact strength of from about 60 joule per meter (J/m) to about 500 J/m at room temperature. In a still a further aspect, the disclosed composition exhibits a notched IZOD impact strength of about 80 J/m to about 400 J/m. In yet a further aspect, the claimed composition exhibits a notched IZOD impact strength of about 100 J/m to about 300 J/m. In other aspects, the notched IZOD impact strength can include exemplary values of about 70 J/m, 100 J/m, 150 J/m, 200 J/m, 250 J/m, 300 J/m, 350 J/m, 400 J/m, 450 J/m, 500 J/m. In still further aspects, the notched IZOD impact strength can be in any range derived from any two values above.

In one aspect, the thermally conductive thermoplastic composition has a through-plane thermal conductivity of from about 0.4 W/mk to about 2.0 W/mK. In a still further aspect, the composition has a through-plane thermal conductivity of from about 0.4 W/mK to about 1.5 W/mK. In yet a further aspect, the composition has a through-plane thermal conductivity of from about 0.4 W/mK to about 1.0 W/mK. In still further aspect, the in-plane thermal conductivity can be any value in any range derived from any two values set forth above.

In a further aspect, the blended thermoplastic polymer composition has an in-plane thermal conductivity of from about 1.0 W/mK to about 4.0 W/mK. In a still further aspect, the blended thermoplastic polymer composition has an in-plane thermal conductivity of from about 1.0 W/mK to about 3.0 W/mK. In yet a further aspect, the blended thermoplastic polymer composition has an in-plane thermal conductivity of from about 1.0 W/mK to about 2.0 W/mK. In a further aspect, exemplary values of the in-plane thermal conductivity are 1.2 W/mK, 1.4 W/mK, 1.6 W/mK, 1.8 W/mK, 2.0 W/mK, 2.2 W/mK, 2.4 W/mK, 2.6 W/mk, 2.8 W/mK, and 3.0 W/mK. In still a further aspect, the in-plane thermal conductivity can be any value in any range derived from any two values set forth above.

In various aspects, the disclosure relates to thermally conductive thermoplastic compositions comprising a polymer matrix, a thermally conductive inorganic filler and an impact modifier composition having a chemically reactive impact modifier. The impact modifier composition may optionally comprise a chemically non-reactive impact modifier. In one aspect, the polymer matrix comprises a polycarbonate (PC), a polyamide (PA), a polybutylene terephthalate (PBT), and a polyethylene terephthalate (PET), or any combination thereof.

In one aspect, the polymer matrix is present in the thermally conductive thermoplastic composition in an amount of from about 30 wt % to about 80 wt % of the total weight of the composition. In a further aspect, the polymer matrix is present in the thermoplastic polymer blend composition in an amount of from about 40 wt % to about 70 wt %. In yet a further aspect, the polymer matrix is present in an amount of from about 40 wt % to about 60 wt %. In one aspect, the polymer matrix is present in an amount including exemplary values of 30 wt %, 35 wt %, 40 wt %, 45 wt %, 50 wt %, 55 wt %, 60 wt %, 65 wt %, 70 wt %, and 75 wt %. In still a further aspect, the polymer matrix can be present in any value in any range derived from any two values set forth above. In aspects where the thermoplastic polymer matrix comprises a blend of two or more polymers selected from the group consisting of a polycarbonate (PC), a polycarbonate copolymer, a polyamide (PA), a polybutylene terephthalate (PBT), and a polyethylene terephthalate (PET), it should be understood that each selected polymer that is present within the thermoplastic polymer matrix can be present in any desired amount relative to the total amount of the thermoplastic polymer matrix. For example, the polycarbonate polymer can be present from about 10 weight % to about 80 weight %, from about 20 weight % to about 60 weight %, or from about 50 weight % to about 75 weight % relative to the total weight of the thermoplastic polymer matrix in the polymer composition.

In another aspect, the thermally conductive thermoplastic composition comprises a chemically reactive impact modifier present in an amount from about 0.5 wt % to about 10 wt %. In other aspects, the chemically reactive impact modifier is present in exemplary values of 1 wt %, 1.5 wt %, 2.0 wt %, 2.5 wt %, 3.0 wt %, 3.5 wt %, 4.0 wt %, 4.5 wt %, 5.0 wt %, 5.5 wt %, 6.0 wt %, 6.5 wt %, 7.0 wt %, 7.5 wt %, 8.0 wt %, 8.5 wt %, 9.0 wt %, and 9.5 wt %. In still a further aspect, the chemically reactive impact modifier can be present in any value in any range derived from any two values set forth above.

In one aspect, the chemically reactive impact modifier is an ethylene copolymer with reactive functional groups selected from, but not limited to, anhydride, carboxyl, hydroxyl, or epoxy. In another aspect, the chemically reactive impact modifier comprises a maleic anhydride grafted ethylene copolymer. In another aspect, the maleic anhydride grafted ethylene copolymer is selected from, but not limited to, ethylene-propylene polymer, ethylene-propylene-diene terpolymer, ethylene-octene copolymer, ethylene-butene copolymer, or styrene-ethylene/butadiene-styrene.

In a further aspect, the thermally conductive thermoplastic composition can optionally further comprise from greater than 0 to about 20 wt % of a chemically non-reactive impact modifier, including exemplary values of 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, and 19 wt %. In still a further aspect, the chemically non-reactive impact modifier can be present in any value in any range derived from any two values above. The term "chemically non-reactive impact modifier" as used herein refers to an impact modifier contains no chemical reactive groups neither in the main polymer chain nor in the side polymer chain. In an aspect, the chemically non-reactive impact modifier is selected from, but not limited to, a polycarbonate-siloxane copolymer, a branched polycarbonate, an acrylic copolymer, a methacrylate-butadiene-styrene, or any combination thereof.

In another aspect, the thermally conductive thermoplastic composition comprises a thermally conductive inorganic filler present in an amount from about 10 wt % to about 50 wt %, including exemplary values of 10 wt %, 15 wt %, 20 wt %, 25 wt %, 30 wt %, 35 wt %, 40 wt %, 45 wt %, and 50 wt %. In still further aspect, the filler can be present in any value in any range derived from any two values above.

In one aspect, the thermally conductive thermoplastic composition comprises a thermally conductive inorganic filler having a thermal conductivity greater than the polymer matrix, selected from but not limited to aluminum nitride, aluminum carbide, aluminum oxide, boron nitride, aluminum oxynitride, magnesium silicon nitride, silicon nitride, silicon nitride, graphite, expanded graphite, graphene, carbon fiber, zinc sulfide, calcium oxide, magnesium oxide, zinc oxide, titanium oxide, magnesium hydroxide, talc, boehmite, aluminum hydroxide, diaspore aluminum hydroxide, gibbsite aluminum hydroxide, calcium carbonate, mica, barium oxide, barium sulfate, calcium silicate, zirconium oxide, silicon oxide, glass beads, magnesium aluminum oxide, calcium magnesium carbonate, ceramic-coated graphite, clay, and any combination thereof.

In one aspect, the thermally conductive inorganic filler is a high thermally conductive filler having a thermal conductivity equal or greater than 50 W/mK. In another aspect, the thermally conductive filler is a medium thermally conductivity filler having a thermal conductivity in the range from about 10 to about 50 W/mK, including exemplary values of 12 W/mK, 15 W/mK, 18 W/mK, 20 W/mK, 22 W/mK, 25 W/mK, 28 W/mK, 30 W/mK, 35 W/mk, 40 W/mK, and 45 W/mK. In still a further aspect, the thermally conductive filler is a low thermally conductive filler having a thermal conductivity less than about 10 W/mK, including exemplary values of greater than 0 W/mK, 0.5 W/mK, 0.1 W/mK, 1 W/mK, 2 W/mK, 3 W/mK, 4 W/mK, 5 W/mK, 6 W/mK, 7 W/mK, 8 W/mK, and 9 W/mK. In still a further aspect, the thermal conductivity can be any value in any range derived from any two values set forth above. In a further aspect, the thermally conductive filler is any combination of a high thermally conductive filler, a medium thermally conductive filler, and a low thermally conductive filler.

In yet another aspect, the thermally conductive inorganic filler is present in regular or irregular shapes or forms, including sphericals, whiskers, flakes, particulate form, fibrous form, or a combination thereof. In certain aspects, the thermal conductive filler is a mono-layer or multiple layer flake or platelet having an aspect ratio between 1 and 200, where aspect ratio refers to the ratio of the longest dimension to the shortest dimension of the particular filler particle, whisker, flake, and/or platelet. The filler may have a maximum dimension in a range of from about 100 nanometers (nm) to about 1500 micrometers (μm) and a minimum dimension in a range of from about 10 nm to about 100 μm.

In one aspect, the thermally conductive thermoplastic composition further comprises a reinforcing filler. In another aspect, the reinforcing filler comprises one or more of clay, mica, glass fiber, or any combination thereof. In yet another aspect, the glass fiber has a circular, non-circular cross section, or a combination thereof.

In one aspect, the thermally conductive thermoplastic composition further comprises from greater than 0 to about 2 wt % of one or more of antioxidant, thermal stabilizer, flow promoter, mold release agent, colorants, pigments or any combination thereof, including exemplary values of 0.1 wt %, 0.5 wt %, 0.8 wt %, 1 wt %, 1.1 wt %, 1.2 wt %, 1.3 wt %, 1.4 wt %, 1.5 wt %, 1.6 wt %. 1.7 wt %, 1.8 wt %, and 1.9 wt %.

The term polycarbonate as used herein is not intended to refer to only a specific polycarbonate or group of polycarbonates, but rather refers to the any one of the class of compounds containing a repeating chain of carbonate groups. In one aspect, a polycarbonate can include any one or more of those polycarbonates disclosed and described in U.S. Pat. No. 7,786,246, which is hereby incorporated by reference in its entirety for the specific purpose of disclosing various polycarbonate compositions and methods for manufacture of same.

In one aspect, the polycarbonate can comprise a further carbonate unit derived from a dihydroxy compound, such as for example a bisphenol. Exemplary bisphenol compounds can comprise 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl) phthalimidine, 2-phenyl-3,3-bis(4-hydroxyphenyl) phthalimidine ("PPPBP"), and 9,9-bis(4-hydroxyphenyl) fluorene. Combinations comprising at least one dihydroxy aromatic compound can also be used. In another aspect, other types of diols can be present in the polycarbonate.

In an aspect, the thermoplastic polymer matrix comprises a polyester-polycarbonate copolymer, and specifically a polyester-polycarbonate copolymer in which the ester units of formula (1) comprise soft block ester units, also referred to herein as aliphatic dicarboxylic acid ester units. Such a polyester-polycarbonate copolymer comprising soft block ester units is also referred to herein as a poly(aliphatic ester)-polycarbonate.

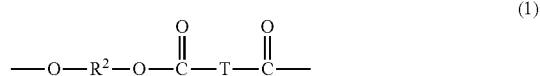

(1)

wherein $R^2$ is a divalent group derived from a dihydroxy compound, and can be, for example, a $C_{2-10}$ alkylene group, a $C_{6-20}$ alicyclic group, a $C_{6-20}$ aromatic group or a polyoxyalkylene group in which the alkylene groups contain 2 to about 6 carbon atoms, specifically 2, 3, or 4 carbon atoms; and T is a divalent group derived from a dicarboxylic acid (aliphatic, aromatic, or alkyl aromatic), and can be, for example, a $C_{4-18}$ aliphatic group, a $C_{6-20}$ alkylene group, a $C_{6-20}$ alkylene group, a $C_{6-20}$ alicyclic group, a $C_{6-20}$ alkyl aromatic group, or a $C_{6-20}$ aromatic group.

$R^2$ can be is a $C_{2-10}$ alkylene group having a straight chain, branched chain, or cyclic (including polycyclic) structure. Alternatively, $R^2$ can be derived from an aromatic dihydroxy compound of formula (2), or from an aromatic dihydroxy compound of formula (3).

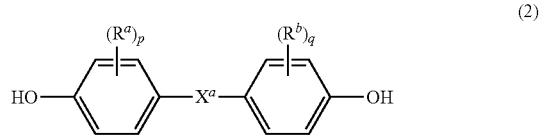

(2)

-continued

(3)

The soft block ester unit can be a $C_{6-20}$ aliphatic dicarboxylic acid ester unit (where $C_{6-20}$ includes the terminal carboxyl groups), and can be straight chain (i.e., unbranched) or branched chain dicarboxylic acids, cycloalkyl or cycloalkylidene-containing dicarboxylic acids units, or combinations of these structural units. In an aspect, the $C_{6-20}$ aliphatic dicarboxylic acid ester unit includes a straight chain alkylene group comprising methylene ($—CH_2—$) repeating units. In a specific aspect, a useful soft block ester unit comprises units of formula (1a):

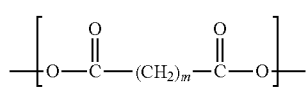
(1a)

aliphatic ester unit of formula (1a), in which the terminal carboxylate groups are connected by a chain of repeating methylene ($—CH_2—$) units (where m is as defined for formula (1a)), is derived from the corresponding dicarboxylic acid or reactive derivative thereof, such as the acid halide (specifically, the acid chloride), an ester, or the like. Exemplary alpha, omega dicarboxylic acids (from which the corresponding acid chlorides can be derived) include alpha, omega $C_6$ dicarboxylic acids such as hexanedioic acid (also referred to as adipic acid); alpha, omega $C_{10}$ dicarboxylic acids such as decanedioic acid (also referred to as sebacic acid); and alpha, omega $C_{12}$ dicarboxylic acids such as dodecanedioic acid (sometimes abbreviated as DDDA). It will be appreciated that the aliphatic dicarboxylic acid is not limited to these exemplary carbon chain lengths, and that other chain lengths within the $C_{6-20}$ limitation can be used. A specific aspect of the poly(aliphatic ester)-polycarbonate having soft block ester units comprising a straight chain methylene group and a bisphenol A polycarbonate group is shown in formula (1c):

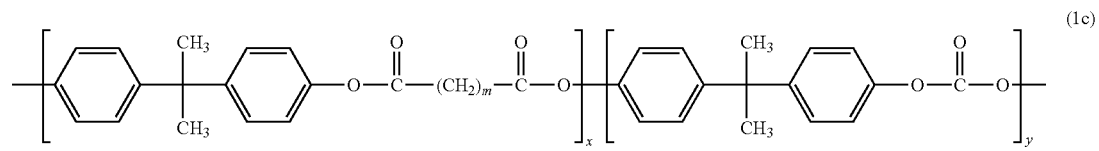
(1c)

where m is 4 to 18. In a specific aspect of formula (1a), m is 8 to 10. The poly(aliphatic ester)-polycarbonate can include less than or equal to 25 wt % of the soft block unit. In an aspect, a poly(aliphatic ester)-polycarbonate comprises units of formula (1a) in an amount of 0.5 to 10 wt %, specifically 1 to 9 wt %, and more specifically 3 to 8 wt %, based on the total weight of the poly(aliphatic ester)-polycarbonate.

The poly(aliphatic ester)-polycarbonate is a copolymer of soft block ester units and carbonate units. The poly(aliphatic ester)-polycarbonate is shown in formula (1b):

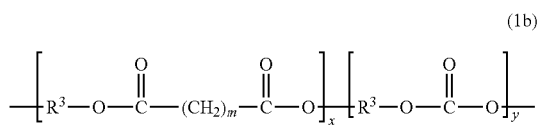
(1b)

where each $R^2$ is independently derived from a dihydroxyaromatic compound of formula (2) or (3), m is 4 to 18, and x and y each represent average weight percentages of the poly(aliphatic ester)-polycarbonate where the average weight percentage ratio x:y is 10:90 to 0.5:99.5, specifically 9:91 to 1:99, and more specifically 8:92 to 3:97, where x+y is 100.

Soft block ester units, as defined herein, can be derived from an alpha, omega $C_{6-20}$ aliphatic dicarboxylic acid or a reactive derivative thereof. In a specific aspect, the soft block ester units can be derived from an alpha, omega $C_{10-12}$ aliphatic dicarboxylic acid or a reactive derivative thereof. In another specific aspect, the carboxylate portion of the where m is 4 to 18 and x and y are as defined for formula (1b). In a specific exemplary aspect, a useful poly(aliphatic ester)-polycarbonate copolymer comprises sebacic acid ester units and bisphenol A carbonate units (formula (1c), where m is 8, and the average weight ratio of x:y is 6:94).

Desirably, the poly(aliphatic ester)-polycarbonate has a glass transition temperature (Tg) of 110 to 145° C., specifically 115 to 145° C., more specifically 120 to 145° C., more specifically 128 to 139° C., and still more specifically 130 to 139° C.

In one aspect, the molecular weight of any particular polycarbonate can be determined by, for example, gel permeation chromatography using universal calibration methods based on polystyrene (PS) standards. Generally polycarbonates can have a weight average molecular weight (Mw), of greater than about 5,000 gram per mole (g/mol) based on PS standards. In one aspect, the polycarbonates can have an Mw of greater than or equal to about 20,000 g/mol, based on PS standards. In another aspect, the polycarbonates have an Mw based on PS standards of about 20,000 to 100,000 g/mol, including for example 30,000 g/mol, 40,000 g/mol, 50,000 g/mol, 60,000 g/mol, 70,000 g/mol, 80,000 g/mol, or 90,000 g/mol. In still further aspects, the polycarbonates have an Mw based on PS standards of about 22,000 to about 50,000 g/mol. In still further aspects, the polycarbonates have an Mw based on PS standards of about 25,000 to 40,000 g/mol.

Molecular weight (Mw and Mn) as described herein, and polydispersity as calculated therefrom, can be determined using gel permeation chromatography (GPC), using a cross-linked styrene-divinylbenzene column, and either PS or PC standards as specified. GPC samples can be prepared in a solvent such as methylene chloride or chloroform at a concentration of about 1 mg/ml, and can be eluted at a flow rate of about 0.2 to 1.0 milliliter per minute (ml/min). In one aspect, the glass transition temperature (Tg) of a polycarbonate can be less than or equal to about 160° C., less than or equal to about 150° C., less than or equal to about 145° C., less than or equal to about 140° C., or less than or equal to about 135° C. In a further aspect, the glass transition temperature of a polycarbonate can be from about 85° C. to about 160° C., from about 90° C. to about 160° C., from about 90° C. to about 150° C., or from about 90° C. to about 145° C. In a still further aspect, the glass transition temperature of a polycarbonate can be from about 85° C. to about 130° C., from about 90° C. to about 130° C., from about 90° C. to about 125° C., or from about 90° C. to about 120° C.

In one aspect, the polymer composition can comprise a thermoplastic polymer matrix comprising one or more polyamides. In one aspect, the polyamide can be present in the thermoplastic polymer matrix in any desired amount. For example, wherein the polyamide is present in the thermoplastic polymer matrix, it can be present in an amount in the range of from greater than 0 weight % to about 100 weight % relative to the total weight of the thermoplastic polymer matrix, including exemplarily values of 5 weight %, 10 weight %, 15 weight %, 20 weight %, 25 weight %, 30 weight %, 35 weight %, 40 weight %, 45 weight %, 50 weight %, 55 weight %, 60 weight %, 65 weight %, 70 weight %, 75 weight %, 80 weight 85 weight %, 90 weight %, and 95 weight % relative to the total weight of the thermoplastic polymer matrix in the polymer composition. In still further aspects, the polyamide can be present in the thermoplastic polymer matrix in any range derived from any two values set forth above. For example, the polyamide can be present from about 10 weight % to about 80 weight %, from about 20 weight % to about 60 weight %, or from about 50 weight % to about 75 weight % relative to the total weight of the thermoplastic polymer matrix in the polymer composition.

Polyamides are generally derived from the polymerization of organic lactams having from 4 to 12 carbon atoms. In one aspect, the lactam can have the formula

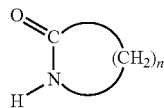

wherein n is about 3 to about 11. In one aspect, the lactam is epsilon-caprolactam having n equal to 5.

Polyamides can also be synthesized from amino acids having from 4 to 12 carbon atoms. In one aspect, the amino acids have the formula

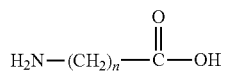

wherein n is about 3 to about 11. In one aspect, the amino acid is epsilon-aminocaproic acid with n equal to 5.

Polyamides can also be polymerized from aliphatic dicarboxylic acids having from 4 to 12 carbon atoms and aliphatic diamines having from 2 to 12 carbon atoms. In one aspect, the aliphatic diamines can have the formula

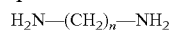

wherein n is about 2 to about 12. In one aspect, the aliphatic diamine is hexamethylenediamine ($H_2N(CH_2)_6NH_2$). The molar ratio of the dicarboxylic acid to the diamine can be about 0.66 to about 1.5. Within this range the molar ratio can be greater than or equal to about 0.81, or equal to about 0.96. In one aspect, this range is an amount of less than or equal to about 1.22, for example, less than or equal to about 1.04. In one aspect, the polyamides are nylon 6, nylon 6,6, nylon 4,6, nylon 6, 12, nylon 10, or the like, or combinations including at least one of the foregoing nylons. In another aspect, the polyamide can be nylon 6. In another aspect, the polyamide can be nylon 6,6.

As disclosed, the polymer composition can comprise a thermoplastic polymer matrix comprising one or more polyalkylene terephthalates. In one aspect, the polyalkylene terephthalates can be present in the thermoplastic polymer matrix in any desired amount. For example, wherein the polyalkylene terephthalate is present in the thermoplastic polymer matrix, it can be present in an amount in the range of from greater than 0 weight % to about 100 weight % relative to the total weight of the thermoplastic polymer matrix, including exemplarily values of 5 weight %, 10 weight %, 15 weight %, 20 weight %, 25 weight %, 30 weight %, 35 weight %, 40 weight %, 45 weight %, 50 weight %, 55 weight %, 60 weight %, 65 weight %, 70 weight %, 75 weight %, 80 weight 85 weight %, 90 weight %, and 95 weight % relative to the total weight of the thermoplastic polymer matrix in the polymer composition. In still further aspects, the polyalkylene terephthalate can be present in the thermoplastic polymer matrix in any range derived from any two values set forth above. For example, the polyalkylene terephthalate can be present from about 10 weight % to about 80 weight %, from about 20 weight % to about 60 weight %, or from about 50 weight % to about 75 weight % relative to the total weight of the thermoplastic polymer matrix in the polymer composition.

In one aspect, the polyalkylene terephthalate can be selected form polyethylene terephthalate (PET), polybutylene terephthalate (PBT), polyethylene naphthalate (PEN), polybutylene naphthalate (PBN), and poly1,3-propylene terephthalate (PPT). In one aspect, the polyalkylene terephthalate can be polyethylene terephthalate. In another aspect, the polyalkylene terephthalate can be polybutylene terephthalate. Other suitable polyalkylene terephthalates include poly(1,4-cyclohexylenedimethylene terephthalate) (PCT), poly(1,4-cyclohexylenedimethylene cyclohexane-1, 4-dicarboxylate) also known as poly(cyclohexane-14-dimethanol cyclohexane-1,4-dicarboxylate) (PCCD), and poly(1, 4-cyclohexylenedimethylene terephthalate-co-isophthalate) (PCTA).

In one aspect, the polyalkylene terephthalate can have a molecular weight of less than 10,000 Daltons. In another aspect, the polyalkylene terephthalate can have a molecular weight of less than 20,000 Daltons. In yet another aspect, the polyalkylene terephthalate can have a molecular weight of less than 30,000 Daltons.

In one aspect, the polyalkylene terephthalate can have a molecular weight from 1,000 Daltons to 100,000 Daltons.

In one aspect, the disclosed thermally conductive thermoplastic composition comprises impact modifiers. In one aspect, the disclosed thermally conductive thermoplastic composition comprises a chemically reactive impact modifier. In one aspect, the chemically reactive impact modifier has at least one reactive group and which, when added to a polymer composition, improves impact properties of the composition expressed in the values of the notched IZOD impact.

In one aspect, the titer thermoplastic polymer blend composition comprises a rubbery impact modifier. The rubber impact modifier is typically a polymeric material which, at room temperature, is capable of recovering substantially in shape and size after removal of a force. However, the rubbery impact modifier should typically have a glass transition temperature of less than 0° C. In certain aspects, the glass transition temperature (Tg) is less than –5° C., –10° C., –15° C., with a Tg of less than –30° C. typically providing better performance. Representative rubbery impact modifiers can include, for example, functionalized polyolefin ethylene-acrylate terpolymers, such as ethylene-acrylic esters-maleic anhydride (MAH) or glycidyl methacrylate (GMA).

The functionalized rubbery polymer can optionally contain repeat units in its backbone which are derived from an anhydride group containing monomer, such as maleic anhydride. In another scenario, the functionalized rubbery polymer can contain anhydride moieties which are grafted onto the polymer in a post polymerization step.

In yet another aspect, the chemically reactive impact modifier comprises a maleic anhydride grafted ethylene copolymer that is selected from a group consisting of ethylene-propylene polymer (MAH-g-EPM), ethylene-propylene-diene terpolymer (MAH-g-EPDM), ethylene-octene copolymer (MAH-g-POE), ethylene-butene copolymer (MAH-g-EBR), and styrene-ethylene/butadiene-styrene (MAH-g-SEBS). In one aspect, the exemplary chemically reactive impact modifiers are commercially available and include, but are not limited to those marketed under the trade name EXXELOR, and are available from Exxon Mobile.

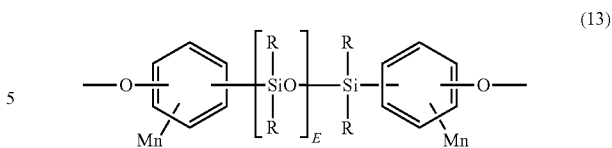

wherein the polydiorganosiloxane block length (E) is from about 20 to about 60; wherein each R group can be the same or different, and is selected from a $C_{1-13}$ monovalent organic group; wherein each M can be the same or different, and is selected from a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, and where each n is independently 0, 1, 2, 3, or 4. The polysiloxane-polycarbonate copolymer also comprises polycarbonate blocks comprising structural units of the general formula (14) below:

wherein at least 60 percent of the total number of $R^1$ groups comprise aromatic moieties and the balance thereof comprise aliphatic, alicyclic, or aromatic moieties.

According to exemplary non-limiting aspects of the disclosure, the polycarbonate-polysiloxane block copolymer comprises diorganopolysiloxane blocks of the general formula (15) below:

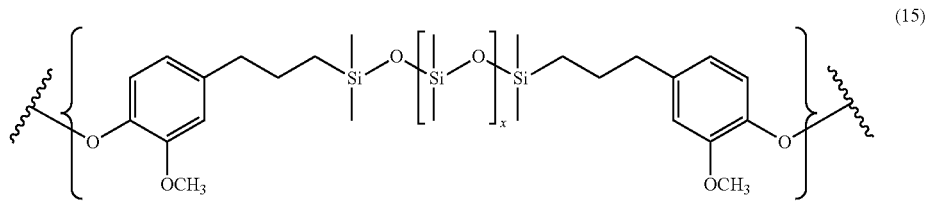

In some aspects of this disclosure, the thermally conductive thermoplastic composition can comprise a chemically non-reactive impact modifier. In one aspect, the chemically non-reactive impact modifier can comprise THPE branched polycarbonate. In yet another aspect, the chemically non-reactive impact modifier can comprise a polycarbonate-polysiloxane polycarbonate. In yet another aspect, the chemically non-reactive impact modifier can comprise an acrylic copolymer. In yet another aspect, the chemically non-reactive impact modifier can comprise a methacrylate-butadiene-styrene.

As used herein, the term polycarbonate-polysiloxane copolymer is equivalent to polysiloxane-polycarbonate copolymer, polycarbonate-polysiloxane polymer, or polysiloxane-polycarbonate polymer. In various aspects, the polycarbonate-polysiloxane copolymer can be a block copolymer comprising one or more polycarbonate blocks and one or more polysiloxane blocks. The polysiloxane-polycarbonate copolymer comprises polydiorganosiloxane blocks comprising structural units of the general formula (13) below:

wherein x represents an integer from about 20 to about 60. The polycarbonate blocks according to these aspects can be derived from BPA monomers.

Diorganopolysiloxane blocks of formula (15) above can be derived from the corresponding dihydroxy compound of formula (16):

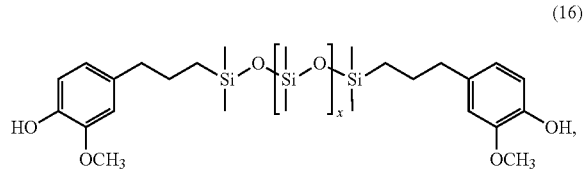

wherein x is as described above. Compounds of this type and others are further described in U.S. Pat. No. 4,746,701 to Kress, et al and U.S. Pat. No. 8,017,0697 to Carrillo. Compounds of this formula can be obtained by the reaction of the appropriate dihydroxyarylene compound with, for example, an alpha, omega-bisacetoxypolydiorangonosiloxane under phase transfer conditions.

Such dihydroxy polysiloxanes can be made by effecting a platinum catalyzed addition between a siloxane hydride of the formula (17):

(17)

wherein x is a previously defined, and an aliphatically unsaturated monohydric phenol such as eugenol to yield a compound of formula (16).

Useful polycarbonate-polysiloxane copolymers are commercially available and include, but are not limited to, those marketed under the trade name LEXAN™ EXL polymers, and are available from SABIC Innovative Plastics (formerly GE Plastics), including blends of LEXAN™ EXL polymers with different properties.

In a further aspect, the disclosed thermally conductive thermoplastic compositions of the present disclosure can comprise impact modifiers which are essentially elastomeric materials derived from olefins, monovinyl aromatic monomers, acrylic and methacrylic acids, and their derivatives, as well as conjugated dienes. The elastomeric materials can be in the form of homopolymers or copolymers, including random, block, radial block, graft and core-shell polymers. Combinations of impact modifiers can also be used. In one aspect, the impact modifiers do not catalyze hydrolytic degradation of polycarbonates.

As described herein, the thermally conductive thermoplastic composition can further comprise thermally conductive inorganic fillers. Useful thermally conductive fillers are selected from the group consisting of oxide powders, flakes and fibers composed of aluminum oxide (alumina), zinc oxide, magnesium oxide and silicon dioxide; nitride powders, flakes and fibers consisting of boron nitride, aluminum nitride and silicon nitride; metal and metal alloy powders, flakes and fibers composed of gold, silver, aluminum, iron, copper, tin, tin base alloy used as lead-free solder; carbon fiber, graphite flakes or fibers; silicon carbide powder; zinc sulfide, magnesium carbonate and calcium fluoride powder; and the like. For purposes of this description "consisting of" generally has the same meaning as "comprising". These fillers can be used independently, or a combination of two or more of them can be used.

In one aspect, the thermally conductive inorganic filler comprises a high thermally conductivity filler having a thermal conductivity equal or greater than 50 W/mK. In another aspect, the high thermally conductivity filler is selected from the group consisting of aluminum nitride (AlN), aluminum carbide ($Al_4C_3$), aluminum oxide ($Al_2O_3$), boron nitride (BN), aluminum oxynitride (AlON), magnesium silicon nitride ($MgSiN_2$), silicon nitride (SiC), silicon nitride ($Si_3N_4$), graphite, expanded graphite, graphene, carbon fiber and any combination thereof.

In one aspect, the thermally conductive inorganic filler comprises a medium thermally conductivity filler having a thermal conductivity in the range from about 10 to about 30 W/mK. In another aspect, the medium thermally conductivity filler is selected from the group consisting of zinc sulfide (ZnS), calcium oxide (CaO), magnesium oxide (MgO), zinc oxide (ZnO), titanium oxide ($TiO_2$), and any combination thereof.

In a yet further aspect, the thermally conductive inorganic filler comprises a low thermally conductivity filler having a thermal conductivity less than about 10 W/mK. In yet another aspect, the low thermally conductivity filler is selected from the group consisting of magnesium hydroxide ($Mg(OH)_2$), talc ($H_2Mg_3(SiO_3)_4$), boehmite aluminum hydroxide (γ-AlO(H)), diaspore aluminum hydroxide (α-AlO(OH)), gibbsite aluminum hydroxide ($Al(OH)_3$), calcium carbonate ($CaCO_3$), mica, barium oxide (BaO), barium sulfate ($BaSO_4$), calcium silicate ($CaSiO_3$), zirconium oxide ($ZrO_2$), silicon oxide ($SiO_2$), glass beads, magnesium aluminum oxide ($MgO.xAl_2O_3$), calcium magnesium carbonate $CaMg(CO_3)_2$, ceramic-coated graphite, clay, and any combination thereof.

Thermally conductive fillers can be present in particulate or fibrous form. In one aspect, the thermally conductive filler can have a broad particle size distribution. If the particle diameter of the filler is too small, the viscosity of the resin may increase during blending to the extent that complete dispersion of the filler cannot be accomplished. As a result, it may not be possible to obtain resin having high thermal conductivity. If the particle diameter of the filler is too large, it may become impossible to inject the thermally conductive resin into thin portions of the resin injection cavity, especially those associated with heat radiating members. Preferably, the maximum average particle size is less than 300 micrometers (μm), and more preferably, less than 200 μm; as measured using an AccuSizer Model 780A (Particle Sizing Systems, Santa Barbara, Calif.) by using laser-diffraction type particle diameter distribution with a Selas Granulometer "model 920" or a laser-diffraction scattering method particle diameter distribution measuring device "LS-230" produced by Coulter K.K., for instance. Preferably, the average particle size is between 1 μm to 100 μm, and more preferably, between 5 μm to 60 μm. The particles or granules which have multi-modal size distribution in their particle size can also be used. Especially preferred thermally conductive fillers are calcium fluoride, magnesium carbonate or magnesium oxide having a particle size of from about 1 to about 100 μm and preferably about 5 to about 60 μm.

In one aspect, the surface of the thermally conductive filler, or a filler having a thermal conductivity less than 5 W/mK can be processed with a coupling agent, for the purpose of improving the interfacial bonding between the filler surface and the matrix resin. Examples of the coupling agent include silane series, titanate series, zirconate series, aluminate series, and zircoaluminate series coupling agents. Useful coupling agents include metal hydroxides and alkoxides including those of Group Ma thru VIIIa, Ib, IIb, Mb, and IVb of the Periodic Table and the lanthanides. Specific coupling agents are metal hydroxides and alkoxides of metals selected from the group consisting of Ti, Zr, Mn, Fe, Co, Ni, Cu, Zn, Al, and B.

The disclosed thermoplastic polymer blend composition can further comprise one or more reinforcing fillers. In another aspect, the reinforcing filler component can comprise, for example, $TiO_2$; fibers comprising asbestos or the like fibers; silicates and silica powders, aluminum silicate (mullite), synthetic calcium silicate, zirconium silicate, fused silica, crystalline silica graphite, natural silica sand, or the like; boron powders, boron-nitride powder, boron-silicate powders, or the like; alumina; magnesium oxide (magnesia); calcium sulfate (as its anhydride, dihydrate or trihydrate); calcium carbonates, chalk, limestone, marble, synthetic precipitated calcium carbonates, or the like; talc, including but not limited to fibrous, modular, needle shaped, lamellar talc, or the like; wollastonite; surface-treated wollastonite; glass spheres including but not limited to hollow and solid glass spheres, silicate spheres, cenospheres, aluminosilicate (armospheres), or the like; kaolin, including but not limited to hard kaolin, soft kaolin, calcined kaolin, kaolin including various coatings known in the art to facilitate compatibility with the polymeric matrix resin, or the like; single crystal fibers or "whiskers" including but not limited to silicon carbide, alumina, boron carbide, iron, nickel, copper; glass fibers, (including continuous and chopped fibers), including but not limited to E, A, C, ECR, R, S, D, and NE glasses and quartz, or the like; sulfides including but not limited to molybdenum sulfide, zinc sulfide, or the like; barium compounds including but not limited to barium titanate, barium ferrite, barium sulfate, heavy spar, or the like; metals and metal oxides including but not limited to particulate or fibrous aluminum, bronze, zinc, copper and nickel, or the like; flaked fillers including but not limited to as glass flakes, flaked silicon carbide, aluminum diboride, aluminum flakes, steel flakes, or the like; fibrous fillers, for example short inorganic fibers including but not limited to those derived from blends including at least one of aluminum silicates, aluminum oxides, magnesium oxides, and calcium sulfate hemihydrate or the like; natural fillers and reinforcements, including but not limited to wood flour obtained by pulverizing wood, fibrous products such as cellulose, cotton, sisal, jute, starch, cork flour, lignin, ground nut shells, corn, rice grain husks; reinforcing organic fibrous fillers formed from organic polymers capable of forming fibers including but not limited to poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents including but not limited to mica, clay, feldspar, flue dust, fillite, quartz, quartzite, perlite, tripoli, diatomaceous earth, carbon black, or the like, or combinations including at least one of the foregoing fillers or reinforcing agents.

In one aspect, the disclosed thermally conductive thermoplastic composition further comprises a reinforcing filler comprising a glass fiber, a mineral filler, or a carbon fiber, or a combination thereof. In a yet further aspect, the reinforcing filler comprises a glass fiber, wherein the glass fiber has a cross section that can be circular, non-circular, or flat. In another aspect, the glass fiber, for example, can be Nittobo (flat) glass fiber, CSG3PA820 and CSG3PA830. In an even further aspect, the glass fiber has a cross section that is round or flat.

In addition to the foregoing components, the disclosed thermoplastic polymer blend compositions can optionally comprise a balance amount of one or more additive materials ordinarily incorporated in the thermoplastic compositions of this type, with the proviso that the additives are selected so as to not significantly adversely affect the desired properties of the thermoplastic compositions. Combinations of additives can be used. Such additives can be mixed at a suitable time during the mixing of the components for forming the composition. Exemplary and non-limiting examples of additive materials that can be present in the disclosed thermoplastic compositions include an antioxidant, a stabilizer (including for example a heat stabilizer, a hydrolytic stabilizer, or a light stabilizer), UV absorbing additive, plasticizer, lubricant, mold release agent, processing aid, antistatic agent, colorant (e.g., pigment and/or dye), or any combination thereof. Such materials are generally used in amounts of about 0.1 wt % to about 20 wt %, optionally about 1 wt % to about 10 wt % the polycarbonate blend composition.

In various aspects, the disclosed blended polycarbonate compositions of the present disclosure can be used in making articles. The disclosed thermally conductive thermoplastic compositions can be formed into useful shaped articles by a variety of means such as injection molding, extrusion, rotational molding, compression molding, blow molding, sheet or film extrusion, profile extrusion, gas assist molding, structural foam molding and thermoforming. The thermally conductive thermoplastic compositions described herein can also be made into film and sheet as well as components of laminate systems. In a further aspect, a method of manufacturing an article comprises extruding the composition into a desired article. In a still further aspect, the extrution is done with co-rotating and counter-rotating twin-screw extruders, single screw extruders, co-kneaders, disc-pack processors and various other types of extrusion equipment. Formed articles include, for example, any computer, smart phones, and business machine housings, automotive parts such as instrument panels, cup holders, glove boxes, interior coverings and the like. In various further aspects, formed articles include, but are not limited to, food service items, medical devices, animal cages, electrical connectors, enclosures for electrical equipment, electric motor parts, power distribution equipment, communication equipment, computers and the like, including devices that have molded in snap fit connectors, protected graphics such as signs, outdoor enclosures such as telecommunication and electrical connection boxes, construction applications such as roof sections, enclosures, outdoor furniture, aircraft components, boats and marine equipment, outboard motor housings, depth finder housings, personal water-craft, pools; spas; hot-tubs; steps, step coverings; windows, floors, decorative window furnishings or treatments; treated glass covers, garden tractors, lawn mowers, and tools, sports equipment and toys, golf course markers; utility pit covers, keyboards, housings, light fixtures, helmets and personal protective equipment, coated textiles, film and prints, coated articles, and like applications.

In various aspects, the present disclosure pertains to and includes at least the following aspects.

Aspect 1: A thermally conductive thermoplastic composition, comprising: (a) a polymer matrix; (b) An impact modifier composition having a chemically reactive impact modifier, and, optionally, a chemically non-reactive impact modifier, and (c) a thermally conductive inorganic filler; wherein the thermoplastic polymer blend composition exhibits a through-plane thermal conductivity equal or greater than 0.4 W/mK, an in-plane thermal conductivity equal or greater than 1.0 W/mK, and wherein the thermoplastic polymer blend composition exhibits a notched IZOD impact strength measured accordingly to ASTM D256 higher than that of an identical reference polymer blend composition in the absence of the chemically reactive impact modifier.

Aspect 2: A thermally conductive thermoplastic composition, comprising: (a) from about 30 wt % to about 80 wt % of a polymer matrix; (b) from about 0.5 wt % to about 10 wt % of a chemically reactive impact modifier and (c) from about 10 wt % to about 50 wt % of a thermally conductive inorganic filler; wherein the thermally conductive thermoplastic composition exhibits a through-plane thermal conductivity equal or greater than 0.4 W/mK, an in-plane thermal conductivity equal or greater than 1.0 W/mK, and wherein the thermoplastic polymer blend composition exhibits a notched IZOD impact strength measured accordingly to ASTM D256 higher than that of an identical reference polymer blend composition in the absence of the chemically reactive impact modifier.

Aspect 3: The thermally conductive thermoplastic of any one of Aspects 1-2, wherein the polycarbonate component comprises a bisphenol A polycarbonate polymer.

Aspect 4: The thermally conductive thermoplastic composition of any one of Aspects 1-3, wherein the chemically reactive impact modifier comprises a maleic anhydride grafted ethylene copolymer.

Aspect 5: The thermally conductive thermoplastic composition of any one of Aspects 1-4, wherein the maleic anhydride grafted ethylene copolymer is selected from a group consisting of ethylene-propylene polymer (MAH-g-EPM), ethylene-propylene-diene terpolymer (MAH-g-EPDM), ethylene-octene copolymer (MAH-g-POE), ethylene-butene copolymer (MAH-g-EBR), styrene-ethylene/butadiene-styrene (MAH-g-SEBS).

Aspect 6: The thermally conductive thermoplastic composition of any one of Aspects 1-5, further comprising from greater than 0 to about 20 wt % of a second impact modifier.

Aspect 7: The thermally conductive thermoplastic composition of any one of Aspects 1-6, wherein the second impact modifier comprises one or more of polycarbonate-siloxane copolymer, a branched polycarbonate, an acrylic copolymer, a methacrylate-butadiene-styrene, or any combination thereof.

Aspect 8: The thermally conductive thermoplastic composition of any one of Aspects 1-7, wherein the thermally conductivity filler is selected from but not limited to the group consisting of aluminum nitride, aluminum carbide, aluminum oxide, boron nitride, aluminum oxynitride, magnesium silicon nitride, silicon nitride, silicon nitride, graphite, expanded graphite, graphene, magnesium hydroxide, talc, boehmite aluminum hydroxide, diaspore aluminum hydroxide, gibbsite aluminum hydroxide, calcium carbonate, mica, barium oxide, barium sulfate, calcium silicate, zirconium oxide, silicon oxide, glass beads, magnesium aluminum oxide, calcium magnesium carbonate, ceramic-coated graphite, clay, zinc sulfide, calcium oxide, magnesium oxide, zinc oxide, titanium oxide, carbon fiber, and any combination thereof.

Aspect 9: The thermally conductive thermoplastic composition of any one of Aspects 1-8, wherein the thermally conductive inorganic filler comprises a high thermally conductivity filler having a thermal conductivity equal or greater than 50 W/mK.

Aspect 10: The thermally conductive thermoplastic composition of any one of Aspects 1-9, wherein the thermally conductive inorganic filler comprises a medium thermally conductivity filler having a thermal conductivity in the range from about 10 to about 30 W/mK.

Aspect 11: The thermally conductive thermoplastic composition of any one of Aspects 1-10, wherein the thermally conductive inorganic filler comprises a low thermally conductivity filler having a thermal conductivity less than about 10 W/mK.

Aspect 12: The thermally conductive thermoplastic composition of any one of Aspects 1-10, wherein the thermally conductivity filler is Talc, boron nitride, $TiO_2$, or graphite.

Aspect 13: The thermoplastic polymer blend composition of any one of Aspects 1-12, wherein the thermally conductive inorganic filler is present in particulate form, fibrous form, or a combination thereof.

Aspect 14: The thermally conductive thermoplastic composition of any one of Aspects 1-13, wherein the reinforcing filler comprising one or more of clay, mica, glass fiber, carbon fiber, or any combination thereof.

Aspect 15: The thermally conductive thermoplastic composition of any one of Aspects 1-14, further comprising from greater than 0 to about 2 wt % of one or more of antioxidant, thermal stabilizer, flow promoter, mold release agent, colorants, pigments or any combination thereof.

Aspect 16: An article formed from of any one of Aspects 1-15.

Aspect 17: A method of making a thermally conductive thermoplastic composition, comprising: a) providing (i) a polymer matrix; (ii) a chemically reactive impact modifier, and, optionally, a chemically non-reactive modifier, and (iii) a thermally conductive inorganic filler; and b) mixing all components to create a mixture that does not exceed 100 wt %, and wherein all weight percent value are based on the total weight of the composition; and wherein the thermally conductive thermoplastic composition exhibits a through-plane thermal conductivity equal or greater than 0.4 W/mK, an in-plane thermal conductivity equal or greater than 1.0 W/mK, and the formed thermoplastic polymer blend composition exhibits a notched IZOD impact strength measured accordingly to ASTM D256 higher than that of an identical reference polymer blend composition in the absence of the chemically reactive impact modifier.

Aspect 18: A method of making a thermally conductive thermoplastic composition, comprising: a) providing (i) from about 30 wt % to about 80 wt % of a polymer matrix; (ii) from about 0.5 wt % to about 10 wt % of a chemically reactive impact modifier and (iii) from about 10 wt % to about 50 wt % of a thermally conductive inorganic filler; b) mixing all components to create a mixture that does not exceed 100 wt %, and wherein all weight percent value are based on the total weight of the composition; and wherein the thermally conductive thermoplastic composition exhibits a through-plane thermal conductivity equal or greater than 0.4 W/mK, an in-plane thermal conductivity equal or greater than 1.0 W/mK, and the formed thermoplastic polymer blend composition exhibits a notched IZOD impact strength measured accordingly to ASTM D256 higher than that of an identical reference polymer blend composition in the absence of the chemically reactive impact modifier.

While aspects of the present disclosure can be described and claimed in a particular statutory class, such as the system statutory class, this is for convenience only and one of skill in the art will understand that each aspect of the present disclosure can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

EXAMPLES

General Materials and Methods

All samples described herein were prepared via melt extrusion by feeding a pre-blend polymer mixture of the raw materials listed in Table 1 into a Toshiba SE37 Twin Screw Extruder from one or multiple feeders, or separately feeding each of the raw materials into extruder from one or more multi-feeders. The one or any forgoing mentioned powder or pellet shaped organic polymers, or any polymer combinations can be first dry blended together, or dry blended with any combination of foregoing mentioned fillers or additive, and then fed into an extruder from one or more multi-feeders. Alternatively, each component can be fed separately into the extruder from one or more multi-feeders. Typically, the polymer matrix, the impact modifers, and the other additives are fed into the extruder through a main throat hopper, whereas the thermally conductive fillers are fed into the extruder through a downstream side feeder.

In the Examples described herein, a Toshiba SE37 twin-screw co-rotating extruder was used to make the compositions based on the designed formulations. All components were pre-blended except for the thermally conductive fillers and fed into the main throat hopper. The thermally conductive fillers were fed into the extruder through a downstream side feeder.

The barrel temperature for the extruder during compounding can be set at any temperature where at least a portion of the organic polymer has reached a temperature greater than or equal to about the melting temperature of the semi-crystalline resin, or to the glass transition temperature of the amorphous resin.

It is further understood that moldable composition comprising one or more of the foregoing mentioned organic polymers and the fillers can be subjected to the multiple blending and forming steps if desirable. For example, the moldable composition can be first extruded and formed into the pellets. The pellets can be fed into molding machine to form any desirable shape or product. Alternatively, the moldable composition originating from a single melt blender can be further formed into sheets or strands and subjected to post-extrusion processes such as annealing, and uniaxial or biaxial orientation.

In the Examples described herein, the samples were prepared using a Twin screw extruder (Toshiba TEM-37BS, L/D=40.5), the temperature of the extruder barrel was set at 250–300° C. Pellets extruded from the extruder were then injection molded into 80×10×3 mm bars and cut into 10×10×3 millimeter (mm) square samples for through plane thermal conductivity (TC) measurements. To evaluate in plane thermal conductivity (TC), pellets were molded into Φ100×0.4 sheets and cut into Φ25×0.4 mm round samples.

The thermal diffusivity ($\alpha$, square centimeter per second ($cm^2/s$)) and the specific heat ($C_p$, joule per gram per kelvin (J/g-K)) of the sample were measured using NANOFLASH LFA447 against pyroceram reference having similar thickness. The density (p, gram per cubic centimeter ($g/cm^3$)) of the sample was measured using a water immersion method (ASTM D792). The thermal conductivities (k, W/m-K) in through plane and in in plane direction have been then calculated as a product of the thermal diffusivity, the specific heat, and the density: $\kappa=\alpha(T)\ C_p(T)\ \rho(T)$. Each point was repeated three times to ensure repeatability of the results.

Pellets extruded from the extruder were also injection molded into the standard testing bar for impact strength and additional physical and mechanical properties testing accordingly to the available ASTM methods.

The heat deflection temperature ("HDT") was determined using the ASTM D648 standard at 1.82 MPa on 3.2 mm bars. The HDT is reported in units of ° C.

The notched IZOD impact ("NII") test was carried out on 3.2 mm bars according to ASTM D 256 at 23° C. and −20° C. NII is reported in J/m units. Unnotched IZOD Impact was measured according to ASTM D4812 at room temperature.

Thermal conductivity (Tc) including through plane and in plane has been measured according to ASTM E1461 standard.

Tensile properties (tensile strength and tensile elongation) were measured on 3.2 mm bars in accordance with ASTM D638. Tensile strength and tensile modulus are reported in units of MPa and tensile elongation at break is reported in percent (%).

The melt volume rate ("MVR") was measured at a 300° C./1.2 kilogram force (kgf) load in accordance with ASTM D1238. The MVR is reported in units of cubic centimeters per 10 minutes ($cm^3/10$ min).

"Melt Volume Rate" (MVR) as used herein can measure the rate of extrusion of a thermoplastic through an orifice at a prescribed temperature and load. The MVR measurement is flow rate of a polymer in a melt phase as determined using the method of ASTM-D1238-10. The MVR of a molten polymer is measured by determining the amount of polymer that flows through a capillary of a specific temperature over a specified time using standard weights at a fixed temperature. MVR is expressed in cubic centimeters per 10 minutes ($cm^3/10$ min) at a particular temperature per weight value. MVR can be measured according to the method of ASTM-D1238-10 at 1.2 kilogram (kg) at 300° C. The higher the MVR value of a polymer at a specific temperature, the greater the flow of that polymer at that specific temperature.

Raw Materials

The compositions in the Examples below were prepared from the components described in Table 1.

TABLE 1

Raw materials components.

| MATERIAL CODE | MATERIAL DESCRIPTION | MATERIAL CAS# | ADDITIONAL INFORMATION |
|---|---|---|---|
| PC-1 | SEBACIC ACID/BPA COPOLYMER | 137397-37-6 | Resin (HFD PC, Low $M_w$) |
| PC-2 | SEBACIC ACID/BPA/PCP POLYESTERCARBONATE | 137397-37-6 | Resin (HFD PC, High $M_w$) |
| PC-3 | 100 GRADE PCP | 111211-39-3 | Resin (BPA PC, High $M_w$) |
| PC-4 | PCP1300 | 111211-39-3 | Resin (BPA PC, Low $M_w$) |
| B-PC1 | BRANCHED THPE, HBN ENDCAPPED PC | 111211-39-3 | Resin |
| PA-1 | Polyamide 6, Ultramid B27 03 from BASF | 25038-54-4 | Resin |
| EXL PC | 20% PC/SILOXANE COPOLYMER, PCP ENCAPPED | 202483-49-6 | Impact Modifier |

TABLE 1-continued

Raw materials components.

| MATERIAL CODE | MATERIAL DESCRIPTION | MATERIAL CAS# | ADDITIONAL INFORMATION |
|---|---|---|---|
| B-PC2 | THPE BRANCHED PC RESIN | 111211-39-3 | Impact Modifier |
| TALC | TALC GH7(05) from Hayashi Kasei | 14807-96-6 | filler |
| TiO2 | COATED $TiO_2$ | 13463-67-7 | filler |
| BN | HEXAGONAL BORON NITRIDE BNHN | 21645-51-2 | Filler |
| MDH | Magnesium hydroxide H5 IV from Albemarle | 7631-86-9 | Filler |
| GF | Glass fiber, PFG3540-1/8 from PPG Industries, Inc. | 10043-11-5 | Reinforced |
| CRIM-1 | EXXELOR 1801 from Exxon Mobile | 1309-42-8 | Impact Modifier |
| CRIM-2 | EXXELOR VA1803 | 65997-17-3 | Impact Modifier |
| IM-1 | EXL3330 from Rohm & Haas | 108-31-6 | Impact Modifier |
| IM-2 | EXL2691A from Rohm & Haas | 31609-12-2 | Impact Modifier |

Example Set 1

To investigate the effect of a chemically reactive impact modifier (CRIM) on a polycarbonate composition filled with Talc, Examples 1-4 were prepared. The amount of Talc has been kept constant, specifically, the amount of Talc was 15 wt % for all Examples. Table 2 shows the property measured for Examples 1-4 using existing ASTM standards. The amount of chemically reactive impact modifier was gradually increased from 1 wt % (Example 1) to 5 wt % (Example 4), and results are presented in Table 3. It can be seen that impact properties of the composition improve with increasing the amount of CRIM from 1 to 3 wt % (Examples 1-3), and reach a plateau value with a further addition of CRIM (Examples 3-4). No significant change was observed in the thermal conductivity of the samples.

TABLE 2

Test Methods for Examples 1-4.

| Property | Test method |
|---|---|
| MVR | ASTM D1238, 300 C./1.2 Kg, |
| Abusive MVR | ASTM D1238, 300 C./1.2 Kg |
| % ASH | |
| Notched IZOD@RT | ASTM D256 |
| Ductility @RT | ASTM D256 |
| Notched IZOD @ −20° C. | ASTM D256 |
| Ductility @−20° C. | ASTM D256 |
| Unnotched IZOD@RT | ASTM D4812 |
| Through plane $T_c$ | ASTM E1641 |
| In plane $T_c$ | ASTM E1641 |
| HDT | ASTM D648 |

TABLE 3

Influence of reactive impact modifier (RIM) on Polycarbonate filled with Talc.

| | UNITS | EX. 1 | EX. 2 | Ex. 3 | EX. 4 |
|---|---|---|---|---|---|
| CODE | | | | | |
| TALC | % | 15 | 15 | 15 | 15 |
| PC-2 | % | 10 | 10 | 10 | 10 |
| PC-1 | % | 73.3 | 72.3 | 71.3 | 69.3 |
| CRIM-1 | % | 1 | 2 | 3 | 5 |
| Other Additives | | 0.7 | 0.7 | 0.7 | 0.7 |
| TYPICAL PROPERTIES | | | | | |
| MVR | $cm^3$/10 min | 12.2 | 11.3 | 11.6 | 9.8 |
| Abusive MVR | $cm^3$/10 min | 13.7 | 12.8 | 11.7 | 11.3 |
| % ASH | % | 14.8 | 14.8 | 14.7 | 14.8 |
| Notched IZOD@RT | J/m | 98.9 | 129 | 143 | 145 |
| Ductility @RT | % | 0 | 0 | 0 | 0 |
| Notched IZOD @ −20° C. | J/m | 72.1 | 79.5 | 82.5 | 82.4 |
| Ductility @−20° C. | % | 0 | 0 | 0 | 0 |
| Unnotched IZOD@RT | J/m | 2160 | 2160 | 2160 | 2160 |
| Ductility @RT | % | 100 | 100 | 100 | 100 |
| Through plane $T_c$ | | 0.43 | 0.41 | 0.43 | 0.47 |
| In plane $T_c$ | | 1.48 | 1.45 | 1.48 | 1.82 |
| HDT | ° C. | 117 | 115 | 114 | 114 |

To investigate the effect of various impact modifiers on mechanical and physical properties of the blend, Examples 1A-8A were prepared. The measured properties and ASTM standards are listed in Table 4. The results are demonstrated in Table 5. The weight percent of different impact modifier was varied. Examples 1A-4A had different amounts of impact modifiers, without any presence of chemically reactive impact modifiers (CRIM). Example 5A only contained the chemically reactive impact modifier, wherein Examples 6A-8A contained a constant amount of the chemically reactive impact modifier and various amounts of other modifiers. It can be seen that when use alone, Example 5A which contains 2% CRIM gives a higher impact strength comparing to Examples 1A-4A that contain 10% of PC/Siloxane, 10% branched polycarbonate, 5% of acrylic copolymer, and 5% MBS based impact modifiers respectively. Furthermore, it can be clearly seen that Examples 6A-8A containing 2 wt % of the chemically reactive impact modifier combined with 10 wt % of PC/Siloxane copolymer used as an impact modifier, or 5% of butyl acrylate based impact modifier (EXL 3330 from Rohm&Haas), or a mixture of 10 wt % of PC/Siloxane copolymer and THPE Branched PC resin impact modifier demonstrate improved impact and ductile properties. The combination of one or more impact modifiers selected from EXL PC, branched PC or butyl acrylate based impact modifier with reactive impact modifier demonstrate an excellent synergy effect.

TABLE 4

Test Methods for Examples 1A-8A.

| PROPERTY | TEST METHOD |
|---|---|
| MVR | ASTM D1238, 300 C./1.2 Kg, dwell time 360 seconds |
| abusive MVR | ASTM D1238, 300 C./1.2 Kg, dwell time 1080 seconds |
| % Ash | |
| Notched IZOD | ASTM D256, RT |
| Notched IZOD | ASTM D256, −20 C. |
| Unnotched IZOD | ASTM D4812, RT |
| HDT | ASTM D648 |
| Through plane Tc | ASTM E1461 |
| In plane Tc | ASTM E1461 |

TABLE 5

Comparison of different impact modifiers in Polycarbonate filled with 15% of Talc.

| | UNIT | Ex. 1A | Ex. 2A | Ex. 3A | Ex. 4A | Ex. 5A | Ex. 6A | Ex. 7A | Ex. 8A |
|---|---|---|---|---|---|---|---|---|---|
| CODE | | | | | | | | | |
| TALC | % | 15 | 15 | 15 | 15 | 15 | 15 | 15 | 15 |
| PC-2 | % | 10 | 10 | 10 | 10 | 10 | 10 | 10 | 10 |
| PC-1 | % | 64.3 | 64.3 | 69.3 | 69.3 | 72.3 | 62.3 | 67.3 | 52.3 |
| EXL PC | % | 10 | | | | | 10 | | 10 |
| B-PC1 | % | | 10 | | | | | | 10 |
| IM-1 | % | | | 5 | | | | 5 | |
| IM-2 | % | | | | 5 | | | | |
| CRIM-1 | % | | | | | 2 | 2 | 2 | 2 |
| Other additives | | 0.7 | 0.7 | 0.7 | 0.7 | 0.7 | 0.7 | 0.7 | 0.7 |
| PROPERTY | | | | | | | | | |
| MVR | cm³/10 min | 16.8 | 15.6 | 8.96 | 6.61 | 11.3 | 9.92 | 6.86 | 7.79 |
| abusive MVR | cm³/10 min | 23.5 | 20.4 | 9.07 | 6.85 | 12.8 | 11.8 | 8.95 | 9.24 |
| % Ash | % | 15.6 | 14.8 | 15.1 | 14.9 | 14.8 | 15.6 | 14.7 | 15.6 |
| Notched IZOD | J/m | 74 | 55.5 | 80.9 | 82.8 | 129 | 422 | 502 | 565 |
| Ductility @ RT | % | 0 | 0 | 0 | 0 | 0 | 100 | 100 | 100 |
| Notched IZOD | J/m | 66.6 | 60.4 | 63.5 | 70.6 | 79.5 | 108 | 115 | 127 |
| Ductility | % | 0 | 0 | 0 | 0 | 0 | 0 | 0 | 0 |
| Unnotched IZOD | J/m | 2010 | 1630 | 1680 | 2060 | 2160 | 2160 | 2160 | 2160 |
| Ductility | % | 100 | 100 | 100 | 100 | 100 | 100 | 100 | 100 |
| HDT | ° C. | 115 | 119 | 116 | 117 | 115 | 115 | 114 | 116 |
| Through plane Tc | | 0.42 | 0.44 | 0.42 | 0.48 | 0.41 | 0.44 | 0.43 | 0.43 |
| In plane Tc | | 1.43 | 1.58 | 1.4 | 1.79 | 1.45 | 1.58 | 1.45 | 1.63 |

Similar trends have been identified in Boron Nitride filled polycarbonate as shown in Tables 6-7. Chemically reactive impact modifiers used alone demonstrated improved impact and ductile properties when compared to PC/Siloxane, branched PC, or acrylate based impact modifiers when used alone. The combination of the chemically reactive impact modifiers with PC/Siloxane, branched PC, or acrylate based impact modifiers demonstrates a strong synergistic effect and improved impact and ductile properties.

TABLE 6

Test Methods for Examples 1B-10B.

| PROPERTY | TEST METHOD |
|---|---|
| MVR | ASTM D1238, 300 C./1.2 Kg |
| abusive MVR | ASTM D1238, 300 C./1.2 Kg |
| % Ash | |
| Notched IZOD | ASTM D256, RT |
| Notched IZOD | ASTM D256, −20 C. |
| Unnotched IZOD | ASTM D4812, RT |
| HDT | ASTM D648 |
| Through plane Tc | ASTM E1461 |
| In plane Tc | ASTM E1461 |

TABLE 7

Examples of CRIM for Polycarbonate filled with Boron Nitride.

| | UNIT | Ex. 1B | Ex. 2B | Ex. 3B | Ex. 4B | Ex. 5B | Ex. 6B | Ex. 7B | Ex. 8B | Ex. 9B |
|---|---|---|---|---|---|---|---|---|---|---|
| CODE | | | | | | | | | | |
| TALC | % | | | | | | | | | |
| BN | % | 20 | 20 | 20 | 20 | 20 | 20 | 20 | 20 | 20 |
| TiO2 | % | | | | | | | | | |
| PC-2 | % | 10 | 10 | 10 | 10 | 10 | 10 | 10 | 10 | 10 |
| PC-1 | % | 59.3 | 64.3 | 64.3 | 67.3 | 65.3 | 63.3 | 57.3 | 47.3 | 62.3 |
| EXLPC | % | 10 | | | | | | 10 | 10 | |
| B-PC1 | % | | | | | | | | 10 | |
| IM-1 | % | | 5 | | | | | | | 5 |
| IM-2 | % | | | 5 | | | | | | |
| CRIM-1 | % | | | | 2 | 4 | 6 | 2 | 2 | 2 |
| Other additives | | 0.7 | 0.7 | 0.7 | 0.7 | 0.7 | 0.7 | 0.7 | 0.7 | 0.7 |
| TYPICAL PROPERTY | | | | | | | | | | |
| MVR | cm³/10 min | 8.3 | 5.4 | 6.4 | 8.8 | 5.1 | 4.7 | 6.2 | 4.9 | 3.4 |
| abusive MVR | cm³/10 min | 8.9 | 4.6 | 5.8 | 10.4 | 6.2 | 4.5 | 6.8 | 5.3 | 3.5 |
| % Ash | % | 20.1 | 20.4 | 20.1 | 20.5 | 20.6 | 20.0 | 20.2 | 19.2 | 20.9 |
| Notched IZOD | J/m | 64 | 59 | 46 | 81 | 90 | 99 | 103 | 143 | 114 |
| Ductility @ RT | % | 0 | 0 | 0 | 0 | 60 | 80 | 100 | 100 | 100 |
| Notched IZOD | J/m | 50 | 43 | 36 | 52 | 51 | 55 | 58 | 67 | 55 |
| Ductility | % | 0 | 0 | 0 | 0 | 0 | 0 | 0 | 20 | 0 |
| Unnotched IZOD | J/m | 424 | 380 | 377 | 1100 | 719 | 685 | 631 | 578 | 636 |
| Ductility | % | 0 | 0 | 0 | 80 | 20 | 40 | 40 | 80 | 60 |
| HDT | ° C. | 121 | 120 | 118 | 118 | 117 | 116 | 119 | 121 | 117 |
| Through plane Tc | | 0.78 | 0.84 | 0.77 | 0.84 | 0.86 | 0.84 | 0.81 | 0.81 | 0.87 |
| In plane Tc | | 3.0 | 2.88 | 2.71 | 3.19 | 3.57 | 3.57 | 3.21 | 3.07 | 3.19 |

Similarly, for the polycarbonate blends having an inorganic filler comprising 20% Talc and 20% of TiO$_2$, a combination of chemically reactive impact modifiers with PC/Siloxane based, Branched Polycarbonate, and acrylate based impact modifiers results in the best impact and ductile performance (Tables 8-9).

TABLE 8

Test Methods for Examples 1C-7C.

| PROPERTY | TEST METHOD |
|---|---|
| Notched IZOD | ASTM D256, RT |
| Unnotched IZOD | ASTM D4812 |
| Notched IZOD | ASTM D256, −20 C. |
| Density | ASTM D 792 |
| Thermal conductivity (Through plane Tc) | ASTM E1461 |
| Thermal conductivity (In plane Tc) | ASTM E1461 |
| Tensile Modulus | ASTM D638 |
| Tensile Strength | ASTM D638 |
| Tensile Elongation | ASTM D638 |

TABLE 9

Examples of polycarbonate filled with Talc & TiO2.

| | UNIT | #1C | #2C | #3C | #4C | #5C | #6C | #7C |
|---|---|---|---|---|---|---|---|---|
| CODE | | | | | | | | |
| TALC | % | 20 | 20 | 20 | 20 | 20 | 20 | 20 |
| TiO2 | % | 20 | 20 | 20 | 20 | 20 | 20 | 20 |
| PC-1 | % | | | | | 20 | 19 | 17.5 |
| PC-2 | % | 60 | 45 | 45 | 45 | 20 | 19 | 17.5 |
| EXL | % | | 15 | 15 | | 10 | 10 | 10 |
| B-PC1 | % | | | | 15 | 10 | 10 | 10 |
| IM-1 | % | | | | | | | 5 |
| CRIM-1 | % | | | | | | 2 | |
| TYPICAL PROPERTY | | | | | | | | |
| % Ash | % | | | | | 40.7 | 40.5 | 41.0 |
| Notched IZOD, RT | | 36.8 | 49.8 | 49.2 | 41.5 | 47.4 | 187 | 129 |
| Unnotched IZOD | J/m | 357 | 389 | 293 | 380 | | | |
| Notched IZOD, −20 C. | J/m | / | / | / | / | 41.8 | 72.1 | 59.3 |
| Density | — | 1.577 | 1.558 | 1.563 | 1.581 | 1.589 | 1.572 | 1.579 |

TABLE 9-continued

Examples of polycarbonate filled with Talc & TiO2.

| | UNIT | #1C | #2C | #3C | #4C | #5C | #6C | #7C |
|---|---|---|---|---|---|---|---|---|
| Thermal conductivity (Through plane Tc) | W/(m · K) | 0.77 | 0.70 | 0.70 | 0.83 | 0.60 | 0.56 | 0.58 |
| Thermal conductivity (In plane Tc) | W/(m · K) | 2.4 | 2.0 | 1.8 | 2.53 | 1.89 | 1.83 | 1.80 |
| Tensile Modulus | MPa | 5671.8 | 4100 | 4170 | 5768 | 4617.2 | 4796.4 | 3148.6 |
| Tensile Strength | MPa | 60.3 | 45.6 | 45.5 | 61.2 | 48.2 | 35.7 | 39.7 |
| Tensile Elongation | % | 1.97 | 2.2 | 2.09 | 2.09 | 2.2 | 3.07 | 2.2 |

It was also demonstrated that for polycarbonate blends comprising three different inorganic fillers, addition of the chemically reactive impact modifier combined with PC/siloxane, branched PC, or acrylate based impact modifiers significantly improve impact and ductile properties of the blends. It was also observed that addition of reactive impact modifiers does not affect the thermal conductivity of the blends (Table 10).

TABLE 10

Examples of different CRIMs to improve impact strength of polycarbonate filled with multiple types of thermal conductive fillers.

| Item code | Item description | Unit | #1D | #2D | #3D | #4D | #5D | #6D |
|---|---|---|---|---|---|---|---|---|
| TALC | Talc GH7(05) from Hayashi Kasei | % | 8 | 8 | 8 | 8 | 8 | 8 |
| BN | Hexagonal Boron Nitride BNHN | % | 8 | 8 | 8 | 8 | 8 | 8 |
| TiO2 | COATED TIO2 | % | 16 | 16 | 16 | 16 | 16 | 16 |
| PC-2 | Sebacic Acid/BPA copolymer | % | | | | | 20 | 19 |
| PC-1 | Sebacic acid/BPA/PCP polyestercarbonate | % | 54.7 | 55.7 | 54.7 | 44.7 | 61.7 | 60.7 |
| EXL | 20% PC/SILOXANE COPOLYMER, PCP ENDCAPPED | % | 10 | 10 | 10 | 10 | | |
| B-PC1 | THPE Branched PC Resin | % | | | | 10 | | |
| IM-1 | EXL3330 from Rohm & Haas | % | | | | | 3 | 5 |
| CRIM-1 | Exxelor 1801 from Exxon mobile | % | 2 | | | | | |
| CRIM-2 | EXXELOR VA1803, in CTC G2M, No found in EDM | % | | 1 | 2 | 2 | 2 | 1 |
| Others | | % | 1.3 | 1.3 | 1.3 | 1.3 | 1.3 | 1.3 |

| Typical Properties | Test Method | Unit | #1D | #2D | #3D | #4D | #5D | #6D |
|---|---|---|---|---|---|---|---|---|
| % Ash | | % | | | | | 40.7 | 40.5 |
| Notched IZOD | ASTM D256, RT | J/m | 355 | 311 | 373 | 379 | 425 | 398 |
| Unnotched IZOD | ASTM D4812 | J/m | 1080 | 753 | 1040 | 1010 | 1130 | 963 |
| Notched IZOD | ASTM D256, −20 C. | J/m | 123 | 117 | 147 | 139 | 141 | 138 |
| Density | ASTM D 792 | — | | | | | | |
| Thermal conductivity (Through plane Tc) | ASTM E1461 | W/(m · K) | 0.5976 | 0.618 | 0.6516 | 0.6216 | 0.648 | 0.642 |
| Thermal conductivity (In plane Tc) | ASTM E1461 | W/(m · K) | 2.064 | 2.1144 | 2.2704 | 2.2764 | 2.0952 | 2.226 |
| Tensile Modulus | ASTM D638 | MPa | 2836 | 3537.2 | 3178 | 3230.8 | 3384.4 | 3669.2 |
| Tensile Strength | ASTM D638 | MPa | 38.3 | 40.3 | 38.1 | 39.1 | 38.1 | 38.6 |
| Tensile Elongation | ASTM D638 | % | 6.1 | 5.67 | 6.06 | 6.9 | 6.79 | 6.15 |

Table 11 shows comparable examples 1E-5E of polycarbonate blends without addition of chemically reactive impact modifiers. It can be seen that in the absence of CRIM, this polycarbonate compositions demonstrate inferior impact and ductile properties compared to the CRIM containing polycarbonate compositions.

TABLE 11

More comparable examples of filled polycarbonate without CRIM.

| Item Code | Item Description | Unit | #1E | #2E | #3E | #4E | #5E |
|---|---|---|---|---|---|---|---|
| EXL | 20% PC/SILOXANE | % | 11.43 | 7.857 | 15 | 0 | 0 |
| B-PC1 | THPE Branched PC Resin | % | 10.09 | 10.18 | 0 | 10 | 20 |
| TALC | Talc GH7(05) from Hayashi Kasei | % | 10.09 | 10.18 | 5 | 10 | 10 |
| BN | Hexagonal Boron Nitride BNHN | % | 2.589 | 5.179 | 10 | 10 | 10 |
| TiO2 | COATED TiO2 | % | 20 | 20 | 20 | 20 | 20 |
| PC-1 | Sebacic acid/BPA/PCP | % | 45.8 | 46.61 | 50 | 50 | 40 |

| Test Description | Unit | #1E | #2E | #3E | #4E | #5E |
|---|---|---|---|---|---|---|
| MVR-Avg (300 C./1.2 kg/360 s) | $cm^3$/10 min | 9.75 | 10.2 | 6.51 | 4.88 | 5.81 |
| MVR-Avg (300 C./1.2 kg/1080 s)) | $cm^3$/10 min | 9.74 | 12.6 | 7.23 | 8.19 | 7.89 |
| NII @ RT-Avg | J/m | 95.9 | 64.9 | 91.9 | 34.8 | 35.4 |
| NII @ −20 C.-Avg | J/m | 41.5 | 57.9 | 62.4 | 39.3 | 39 |
| UNI @ RT-Avg | J/m | 715 | 515 | 468 | 372 | 345 |
| Density-Avg | — | 1.490 | 1.511 | 1.494 | 1.565 | 1.567 |
| T/r plane Thermal conductivity | W/(m·K) | 0.54 | 0.67 | 0.68 | 0.77 | 0.81 |
| In plane Thermal conductivity | W/(m·K) | 1.61 | 2.05 | 2.03 | 2.09 | 1.78 |
| Modulus of Elasticity-Avg | MPa | 3490 | 4123 | 4067 | 6485 | 6528 |
| Stress at Break-Avg | MPa | 40.7 | 47 | 43.8 | 59.8 | 60.6 |
| Elongation at Break-Avg | % | 5.09 | 3.45 | 2.95 | 1.87 | 1.84 |

Table 12 shows comparable examples 1F-6F of PA6 compositions with or without addition of chemically reactive impact modifiers. It can be seen that acrylate based impact modifiers significantly improve impact and ductile properties of the compositions, especially for glass fiber reinforced matrix. It was also observed that addition of reactive impact modifiers does not affect the thermal conductivity of the blends (Table 12).

TABLE 12

More comparable examples of filled PA6.

| | UNIT | #1F | #2F | #3F | #4F | #5F | #6F |
|---|---|---|---|---|---|---|---|
| CODE | | | | | | | |
| PA-1 | % | 70 | 68 | 65 | 63 | 35 | 33 |
| BN | % | 30 | 30 | | | | |
| MDH | % | | | 35 | 35 | 55 | 55 |
| GF | % | | | | | 10 | 10 |
| CRIM-1 | % | | 2 | | 2 | | 2 |
| TYPICAL PROPERTY | | | | | | | |
| Notched IZOD | J/m | 32.9 | 34.2 | 40.9 | 55.2 | 31.8 | 41.4 |
| Unnotched IZOD | J/m | 326 | 400 | 1150 | 1390 | 332 | 528 |
| Density | — | 1.324 | 1.314 | 1.364 | 1.349 | 1.750 | 1.668 |
| Thermal conductivity (Through plane Tc) | W/(m·K) | 1.12 | 1.18 | 0.71 | 0.73 | 1.50 | 1.27 |
| Thermal conductivity (In plane Tc) | W/(m·K) | 3.62 | 3.86 | 1.30 | 1.44 | 1.93 | 1.88 |

The invention claimed is:

1. A thermally conductive thermoplastic composition, comprising:
   a. from about 30 wt % to about 80 wt % of a polycarbonate component;
   b. from about 0.5 wt % to about 10 wt % of a chemically reactive impact modifier comprising one or more of ethylene-propylene polymer (MAH-g-EPM), ethylene-propylene-diene terpolymer (MAH-g-EPDM), ethylene-octene copolymer (MAH-g-POE), and ethylene-butene copolymer (MAH-g-EBR);
   c. from about 10 wt % to about 50 wt % of a thermally conductive inorganic filler; and d. from greater than 0 wt % to 15 wt % of a chemically non-reactive impact modifier comprising a polycarbonate-siloxane copolymer, wherein the thermally conductive thermoplastic composition exhibits a through-plane thermal conductivity equal to or greater than 0.4 W/mK, an in-plane thermal conductivity equal to or greater than 1.0 W/mK, and wherein the thermally conductive thermoplastic composition exhibits a notched IZOD impact strength measured accordingly to ASTM D256 higher than that of an identical reference composition in the absence of the chemically reactive impact modifier.

2. The thermally conductive thermoplastic composition of claim 1, wherein the polycarbonate component comprises a bisphenol A polycarbonate polymer.

3. The thermoplastic polymer blend composition of claim 1, wherein the thermally conductive inorganic filler comprises one or more of aluminum nitride (AlN), aluminum carbide (Al4C3), aluminum oxide (Al2O3), boron nitride (BN), aluminum oxynitride (AlON), magnesium silicon nitride (MgSiN2), silicon nitride (SiC), silicon nitride (Si3N4), graphite, expanded graphite, graphene, magnesium hydroxide (Mg(OH)2), talc (H2Mg3(SiO3)4), boehmite aluminum hydroxide (γ-AlO(H)), diaspore aluminum hydroxide (α-AlO(OH)), gibbsite aluminum hydroxide (Al(OH)3), calcium carbonate (CaCO3), mica, barium oxide (BaO), barium sulfate (BaSO4), calcium silicate (CaSiO3), zirconium oxide (ZrO2), silicon oxide (SiO2), glass beads, magnesium aluminum oxide (MgO.xAl2O3), calcium magnesium carbonate CaMg(CO3)2, ceramic-coated graphite, clay, zinc sulfide (ZnS), calcium oxide (CaO), magnesium oxide (MgO), zinc oxide (ZnO), and titanium oxide (TiO2).

4. The thermally conductive thermoplastic composition of claim 1, wherein the thermally conductive inorganic filler comprises a high thermally conductivity filler having a thermal conductivity equal to or greater than 50 W/mK.

5. The thermally conductive thermoplastic composition of claim 1, wherein the thermally conductive inorganic filler comprises a medium thermally conductivity filler having a thermal conductivity in the range from about 10 to about 30 W/mK.

6. The thermally conductive thermoplastic composition of claim 1, wherein the thermally conductive inorganic filler comprises a low thermally conductivity filler having a thermal conductivity less than about 10 W/mK.

7. The thermally conductive thermoplastic composition of claim 1, wherein the thermally conductive inorganic filler is talc, boron nitride, or graphite.

8. The thermally conductive thermoplastic composition of claim 1, wherein the thermally conductive inorganic filler is present in particulate form, fibrous form, or a combination thereof.

9. The thermally conductive thermoplastic composition of claim 1, further comprising a reinforcing filler comprising one or more of titanium dioxide, clay, mica, glass fiber, and carbon fiber.

10. The thermally conductive thermoplastic composition of claim 1, further comprising from greater than 0 to about 2 wt % of one or more of antioxidant, thermal stabilizer, flow promoter, mold release agent, colorants, pigments or any combination thereof.

11. An article formed from the thermally conductive thermoplastic composition of claim 1.

12. A method of making a thermally conductive thermoplastic composition, comprising:

mixing together a polycarbonate component, a chemically reactive impact modifier comprising one or more of ethylene-propylene polymer (MAH-g-EPM), ethylene-propylene-diene terpolymer (MAH-g-EPDM), ethylene-octene copolymer (MAH-g-POE), and ethylene-butene copolymer (MAH-g-EBR), a thermally conductive inorganic filler, and from greater than 0 wt % to 15 wt % of a chemically non-reactive impact modifier comprising a polycarbonate-siloxane copolymer to create a mixture that does not exceed 100 wt %, wherein all weight percent values are based on the total weight of the composition, and wherein the thermally conductive thermoplastic composition exhibits a through-plane thermal conductivity equal to or greater than 0.4 W/mK, an in-plane thermal conductivity equal to or greater than 1.0 W/mK, and the formed thermally conductive thermoplastic composition exhibits a notched IZOD impact strength measured accordingly to ASTM D256 higher than that of an identical reference composition in the absence of the chemically reactive impact modifier.

13. A method of making a thermally conductive thermoplastic composition, comprising:

mixing together from about 30 wt % to about 80 wt % of a polycarbonate component, from about 0.5 wt % to about 10 wt % of a chemically reactive impact modifier comprising one or more of ethylene-propylene polymer (MAH-g-EPM), ethylene-propylene-diene terpolymer (MAH-g-EPDM), ethylene-octene copolymer (MAH-g-POE), and ethylene-butene copolymer (MAH-g-EBR), from about 10 wt % to about 50 wt % of a thermally conductive inorganic filler, and from greater than 0 wt % to 15 wt % of a chemically non-reactive impact modifier comprising a polycarbonate-siloxane copolymer to create a mixture that does not exceed 100 wt %, wherein all weight percent values are based on the total weight of the composition, and wherein the thermally conductive thermoplastic composition exhibits a through-plane thermal conductivity equal to or greater than 0.4 W/mK, an in-plane thermal conductivity equal to or greater than 1.0 W/mK, and the formed thermally conductive thermoplastic composition exhibits a notched IZOD impact strength measured accordingly to ASTM D256 higher than that of an identical reference composition in the absence of the chemically reactive impact modifier.

* * * * *